(12) United States Patent
Cook et al.

(10) Patent No.: US 6,865,863 B1
(45) Date of Patent: Mar. 15, 2005

(54) METHOD AND APPARATUS FOR PALLETIZING ELONGATED BAGS OF CONTAINER ENDS

(75) Inventors: Steven T. Cook, Bellbrook, OH (US); Brian W. Clark, Lewisburg, OH (US); Steffen W. Kracs, Dayton, OH (US); Dennis F. Moore, Jr., Beavercreek, OH (US); William E. Schneberger, West Carrollton, OH (US); Timothy A. Whitehead, Dayton, OH (US)

(73) Assignee: Dayton Systems Group, Inc., Miamisburg, OH (US)

( * ) Notice: Subject to any disclaimer, the term of this patent is extended or adjusted under 35 U.S.C. 154(b) by 413 days.

(21) Appl. No.: 09/509,415
(22) PCT Filed: Sep. 30, 1998
(86) PCT No.: PCT/US98/20409
§ 371 (c)(1),
(2), (4) Date: Mar. 27, 2000
(87) PCT Pub. No.: WO99/16672
PCT Pub. Date: Apr. 8, 1999

Related U.S. Application Data

(60) Provisional application No. 60/060,518, filed on Sep. 30, 1997.

(51) Int. Cl.[7] .............................................. B65B 53/00
(52) U.S. Cl. .................................. 53/441; 53/540
(58) Field of Search ........................ 53/441, 157, 540

(56) References Cited

U.S. PATENT DOCUMENTS

| 3,664,089 | A | * | 5/1972 | Keck ............................ 53/157 |
| 4,537,010 | A | * | 8/1985 | Mojden et al. ............... 53/447 |
| 4,941,374 | A | * | 7/1990 | Focke ...................... 414/792.9 |
| 5,005,335 | A | * | 4/1991 | Yourgalite et al. ............ 53/399 |
| 5,372,473 | A | * | 12/1994 | Moyden et al. .......... 414/753.1 |
| 5,607,278 | A | * | 3/1997 | Mojden et al. ............. 294/116 |
| 5,794,416 | A | * | 8/1998 | Rahman ...................... 53/157 |

* cited by examiner

Primary Examiner—Scott A. Smith
Assistant Examiner—Gloria R. Weeks
(74) Attorney, Agent, or Firm—Fay, Sharpe, Fagan, Minnich & McKee, LLP

(57) ABSTRACT

A palletizing mechanism (PP, WB, HB1-1, HB-2) supplies a pallet and a length of wrapping paper for receiving successive rows of bags until a full pallet load is prepared. The palletizing apparatus can be mated to the bagger apparatus, and operated synchronously therewith under the management of a common programmable controller. The palletizer apparatus receives each stick of can ends in a predetermined orientation, and maintains the orientation vis-a-vis all sticks in a pallet load. The sticks are placed sequentially into a row of predetermined number of sticks, then that row is loaded onto the top of a layer of wrapping, the first row being supported on a suitable empty pallet, then the wrap is passed over the last placed row. This operation proceeds with the wrap supply following a to-and-fromotion until the desired number of rows is automatically built up on a pallet.

14 Claims, 24 Drawing Sheets

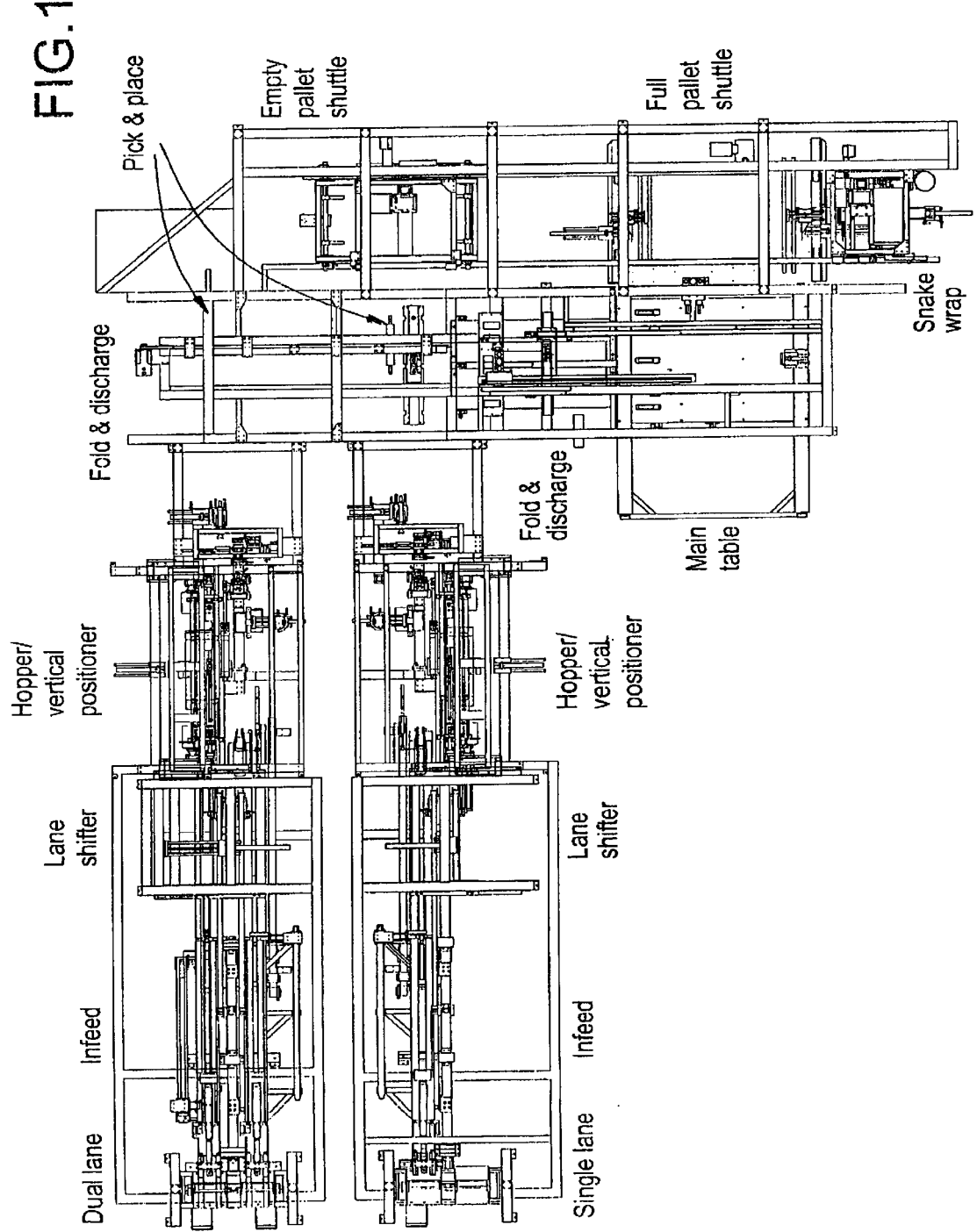

METHOD AND APPARATUS FOR PALLETIZING ELONGATED BAGS OF CONTAINER ENDS

RELATED APPLICATIONS

This application is related to U.S. Provisional Patent Application Ser. No. 60/060,518 filed 30 Sep. 1997 entitled Bagger & Palletizer for Can Ends, and to copending International Patent Application No. PCT/US98/20395 entitled Bagger filed on the same date as this application.

TECHNICAL FIELD

This invention relates to methods and apparatus for packaging can ends, e.g. disc-like end units which have a preparatory curl on their edge and which may also have attached easy-open tabs. In practice such apparatus is often called a bagger, since the preferred manner of packaging the ends places a stack (usually called a "stick") of the ends in a tubular bag which is then folded closed at its initially open end. The invention disclosed relates to methods and apparatus for assembling and placing the sticks on pallets.

BACKGROUND ART

In the early 1970s can ends were placed manually into bags, and the bags were loaded manually into pallet for use at filing/closing machinery. In the mid-1970s semi-automatic bagging equipment was introduced in an effort to keep up with the increased output of newer conversion presses, and that development led to automatic bagging machines, which were first introduced in the mid-1980s. Some of the impetus for this development was the monotony of repeated manual operations, which also appeared to be the cause of repeated strain to the hands of those doing the bagging.

Those automatic machines formed a "stick" of ends and then packaged them 1) by wrapping them from a coil or reel of paper or plastic, or 2) placing the sticks into preformed bags. It was found that kraft paper was the preferred wrapping material since it can be recycled, and since it will "breathe" to void fumes which may linger with the stick of ends from synthetic sealing compounds applied to the ends in an earlier operation, or to void moisture which may linger from water based compounds.

In the early patent prior art, the disclosures in U.S. Pat. Nos. 3,337,064, 3,417,853, 3,545,631 and 3,618,530 are representative of systems which use a pneumatic or similar input conveying system for the individual can ends, and troughs or the like for gathering the ends in a face to face on-edge stack. Mechanical feeding mechanisms engage the curl edges of the generally vertically positioned ends and move them into the input or receiving end of a stack forming in a trough, then the ends are supplied to a filling and closing (end curling) machine. Wrapping a stack is not disclosed, and the filled trough is intended to function as a reservoir for smooth steady supply of ends to the closing machine.

In U.S. Pat. Nos. 3,722,741, 4,000,709, 4,537,550, 4,676, 708 and 5,335,810 more sophisticated buffer systems for stacks of ends are disclosed, wherein the stacks are separated according to a count of stacked ends, and those stacks are loaded into successive vertically arranged carriers on an endless, carrousel-type conveyor which supplies the stacks to a closing machine.

U.S. Pat. No. 3,878,945, and its various divisions U.S. Pat. Nos. 3,962,845, 3,971,189, 4,051,965, and 5,119,617, all disclose features of an automatic bagging system in which ends are supplied to a gathering and counting deice which separates ends into stacks (or "sticks"), wrapping devices for loading the stacks into individual bags, and mechanism for loading the wrapped stacks onto pallets.

U.S. Pat. No. 4,364 relates to a conveying improvement for gathering ends, providing temporary spacing thereof to facilitate curing of previously applied end seam compound. U.S. Pat. No. 4,655,350 discloses an improvement for detecting and removing ends which have been reversed face-to-back (e.g. public to product sides) in the formation of a stack. U.S. Pat. No. 4,742,669 discloses and improved end counting device in the end counting and stack forming systems. U.S. Pat. No. 5,005,340 discloses a system for inspecting an assembled stack of ends. U.S. Pat. No. 5,372, 245 discloses an improved drive for an in-feeding array of assembled ends. U.S. Pat. No. 5,524,947 discloses an improved mechanism for picking and placing stacks (also called "sticks") of ends in the bagging and palletizing process.

U.S. Pat. Nos. 4,537,010 and 5,372,473 disclose more advanced devices for handling bagged stacks of ends and placing them into pallets.

Thus, prior art automatic bagging machines allow lanes of ends from the output of a conversion press to be counted, separated in stacks or sticks, the stacks placed into individual bags, and the bagged stacks are then loaded into a common palletizer, from which a supply is provided to one or more filling and closing devices.

DISCLOSURE OF THE INVENTION

A palletizing mechanism supplies a pallet (support) and a length of wrapping paper (usually Kraft paper or the like) for receiving successive rows of bags until a full pallet load is prepared. The palletizing apparatus can be mated to the aforementioned Bagger Apparatus, and operated synchronously therewith under the management of a common programmable controller; an Allen-Bradley Model No. H-4030 is employed in an actual embodiment. The palletizer apparatus receives each stick (closed bag of can ends of predetermined count) in a predetermined orientation, and maintains the orientation vis-a-vis all sticks in a pallet load. The sticks are placed sequentially into a row of predetermined number of sticks, then that row is loaded onto the top of a layer of wrapping, the first row being supported on a suitable empty pallet, then the wrap is passed over the last placed row. This operation proceeds with the wrap supply following a to-and-fro motion until the desired number of rows is automatically built up on a pallet.

Other objects and advantages of the invention will be apparent from the following description, the accompanying drawings and the appended claims.

BRIEF DESCRIPTION OF THE DRAWINGS

FIG. 1 is a schematic plan view of the major components of the system;

FIGS. 21A-1, 21A-3, 21B-1, and 21-B-3 are together the Process Flow Chart for the palletizer operation.

DESCRIPTION OF THE PREFERRED EMBODIMENT BEST MODE FOR CARRYING OUT THE INVENTION

The present invention is directed to an improved palletizer apparatus which is part of a bagger/palletizer system.

To understand the following description, it is desirable to include first definitions of certain terms, as follows:

A "Stick" is a bag filled with a predetermined number of can ends or lids;

A "Skid" refers to the wooden structure on which a pallet of sticks is built; Filled pallets are formed in the palletizer apparatus;

"Bagger" refers to the portion of the system that forms the sticks by counting ends from the lead (foremost) end in a stream of can ends which are supplied to the bagger apparatus along in-feed rails, the ends being placed on edge and moving face-to-face along such rails; The bagger counts a predetermined number of ends, separates them from the following stream, and places them into a bag, then folds and seals the bag; Sticks are formed in the bagger apparatus, as disclosed in the related International Application PCT/US98/20395.

"Palletizer" refers to the portion of the system that builds layers of filled, sealed bags and places them onto a skid.

The Palletizer

Figure 3:
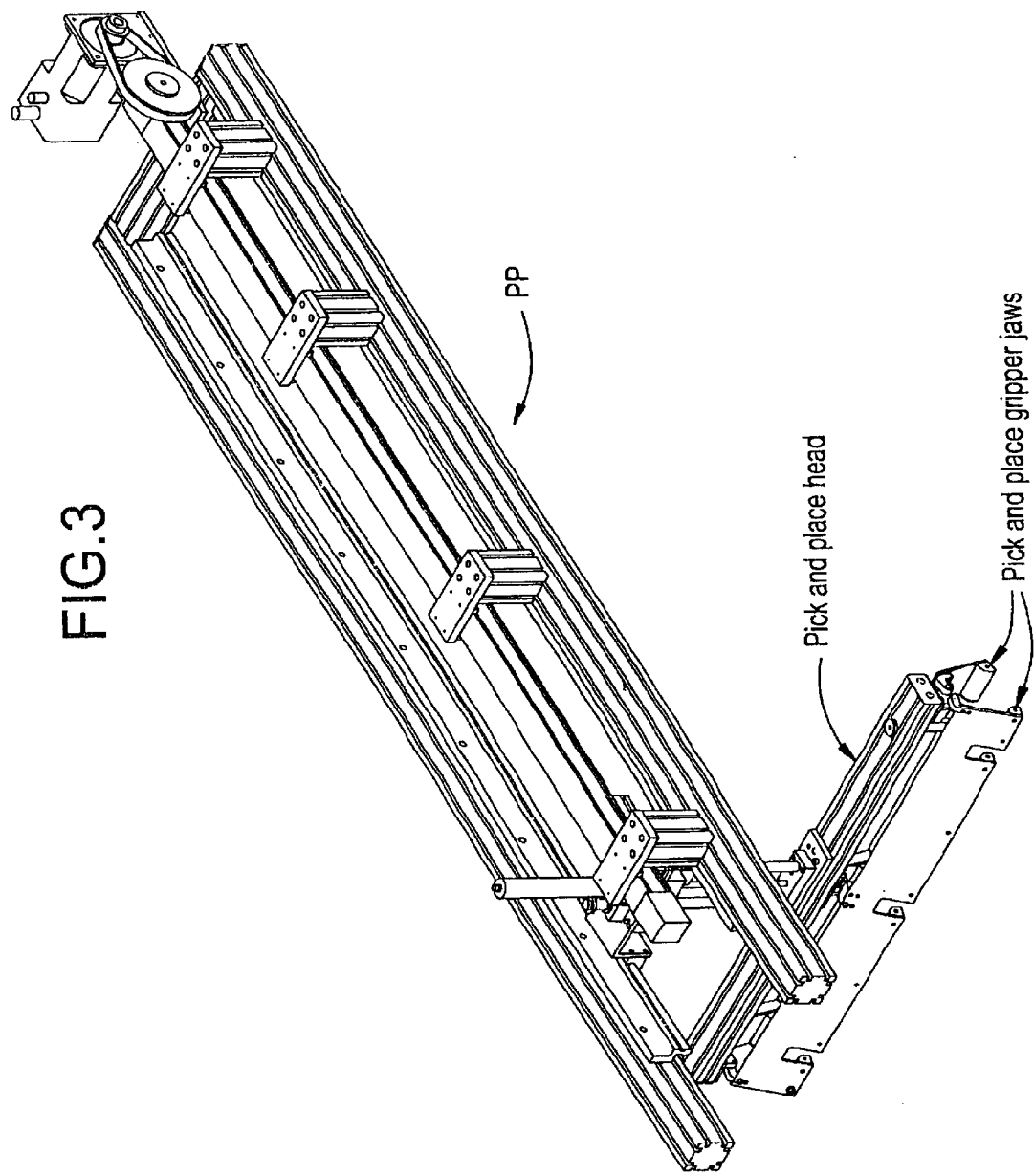
FIG. 3 is a perspective view of the Pick and Place mechanism in the palletizer.
Figure 4:
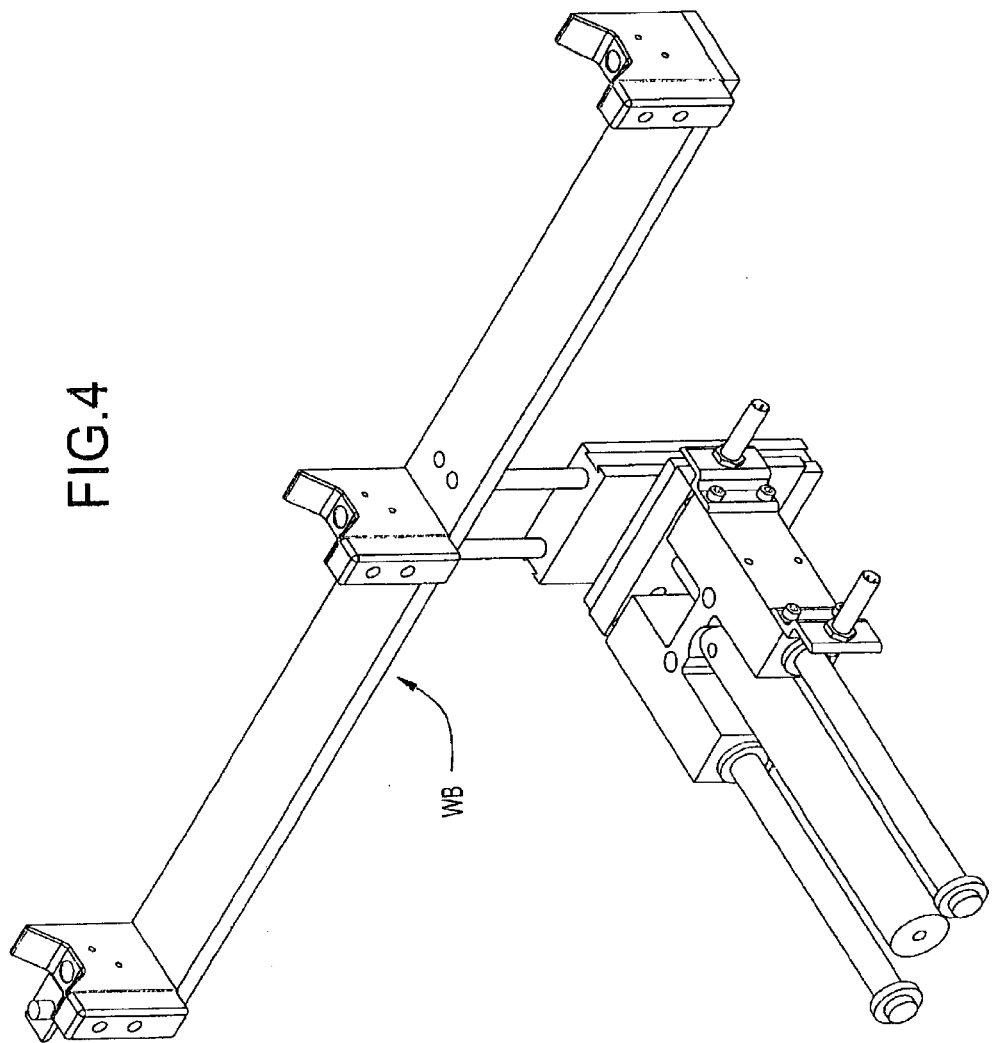
FIG. 4 is a perspective view of the walking beam mechanism.

The Pick and Place, seen in FIG. 3, removes the filled, sealed bags, from the stick discharge grippers of the bagger folding mechanism, and places them on the walking beam mechanism WB (FIG. 4). The walking beam mechanism in turn places each of the sticks in the appropriate position in the staging area. The first (or temporary) hold back device PH-1 (FIG. 5), is comprised of three fingers PH-11 which can inhibit the first stick from rolling, and retain the row until the Primary Hold back is reached.

Figure 6:
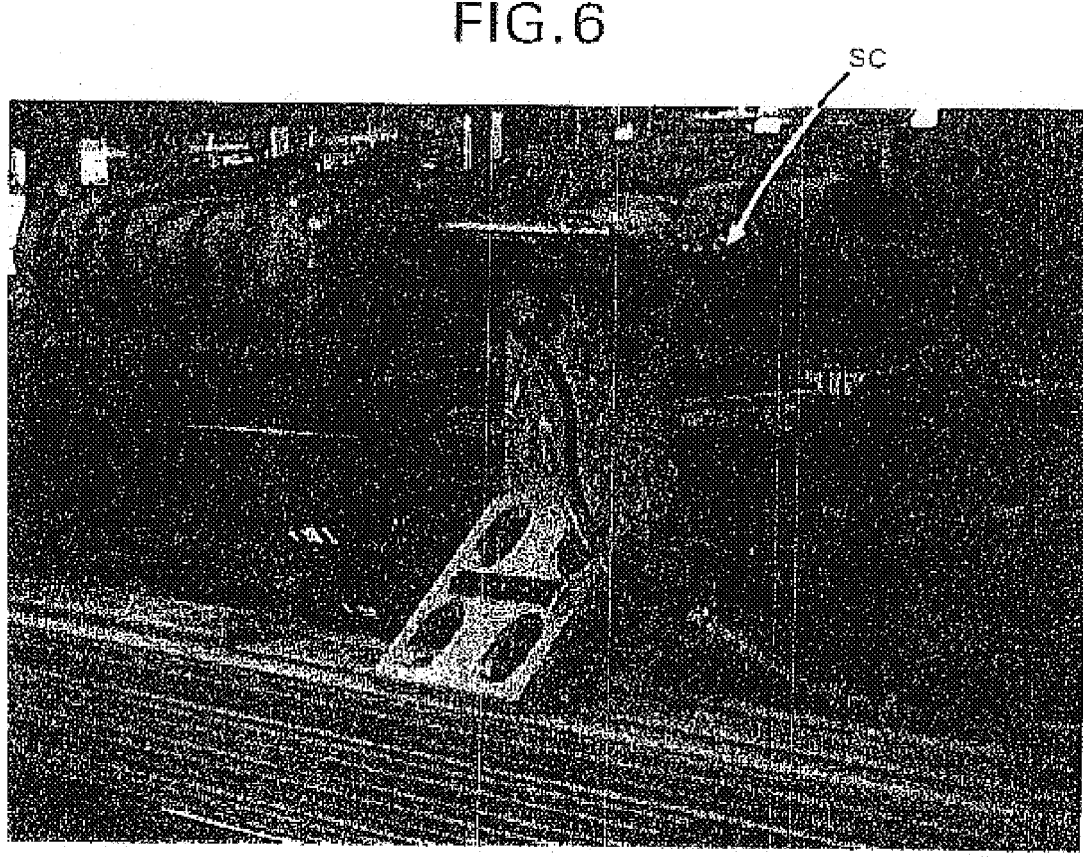
FIG. 6 is a pictorial view of the stick crowder device.

As each stick is placed, the Stick Crowder, also seen in FIG. 6, forces the factory sealed or closed end (against which the ends are pushed in the stick formation) of the bag against a stainless steel place to ensure that each row of the pallet is properly packed.

The Primary Hold back retains the row during building while sticks 8–16 are placed. In conjunction with the Pull Off, the Primary Hold back transfers the completed layer to the Main Table.

FIG. shows the Pull Off, which clamps the row against the Primary Hold back, and transfers the completed layer of the pallet from the staging area to the Main Table.

The Main Table is a movable platform that extends over the pallet and places a completed layer of sticks.

The Skid Storage Lift is the loading point for the empty skids. The X and Y Skid Positioners locate the top skid against the Skid Back Stop.

Figure 11:
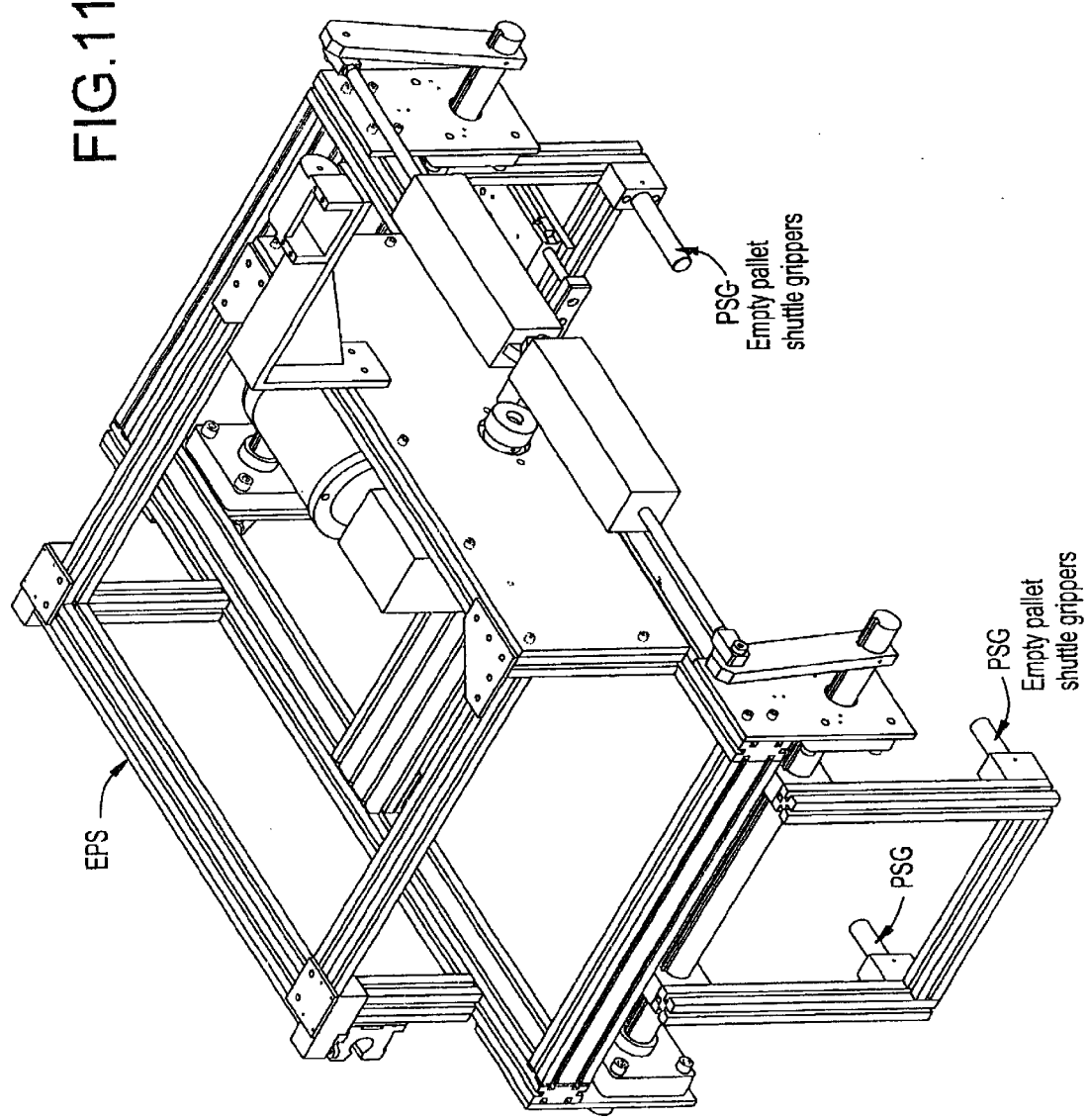
FIG. 11 a perspective view of the empty pallet shuttle.
Figure 12:
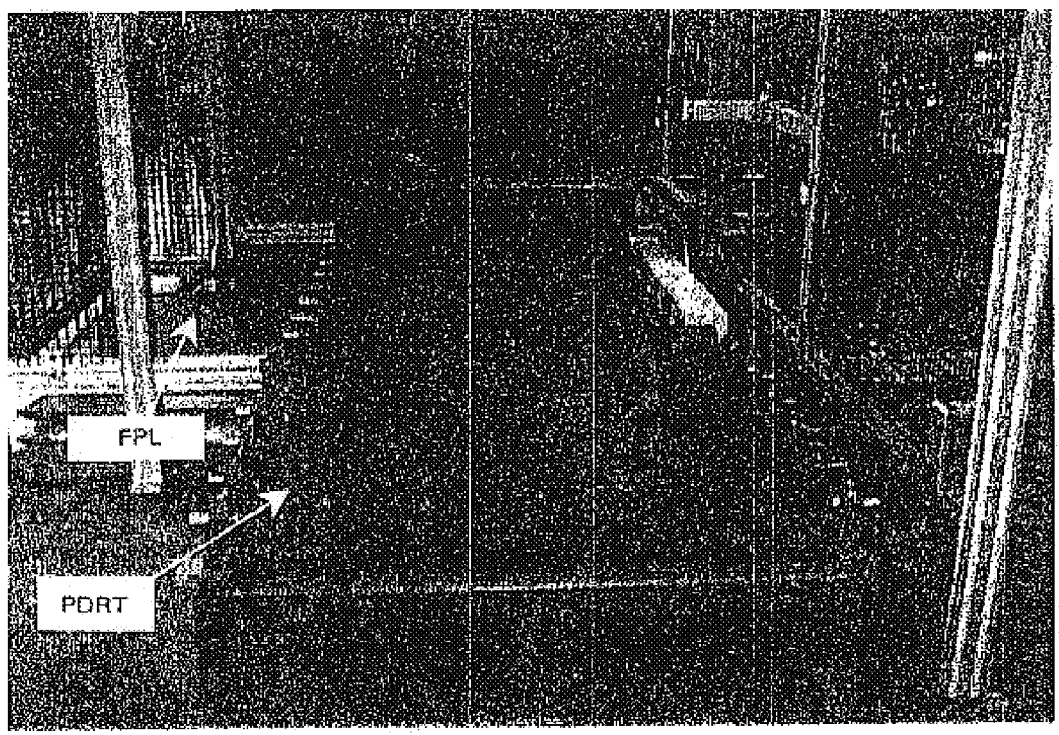
FIG. 12 is a pictorial view of the full pallet lift.

FIG. 11 shows the Skid Shuttle, which contains the Skid Grippers that clamp and align the top skid and transport it to the Pallet Lift area.

The Pallet Lift is the hydraulic lift on which the skid is filled with completed layers. The Pallet Lift has a motorized roller table to transport the finished pallet to the Pallet Discharge Roller Table for removal by the operator.

Figure 13:
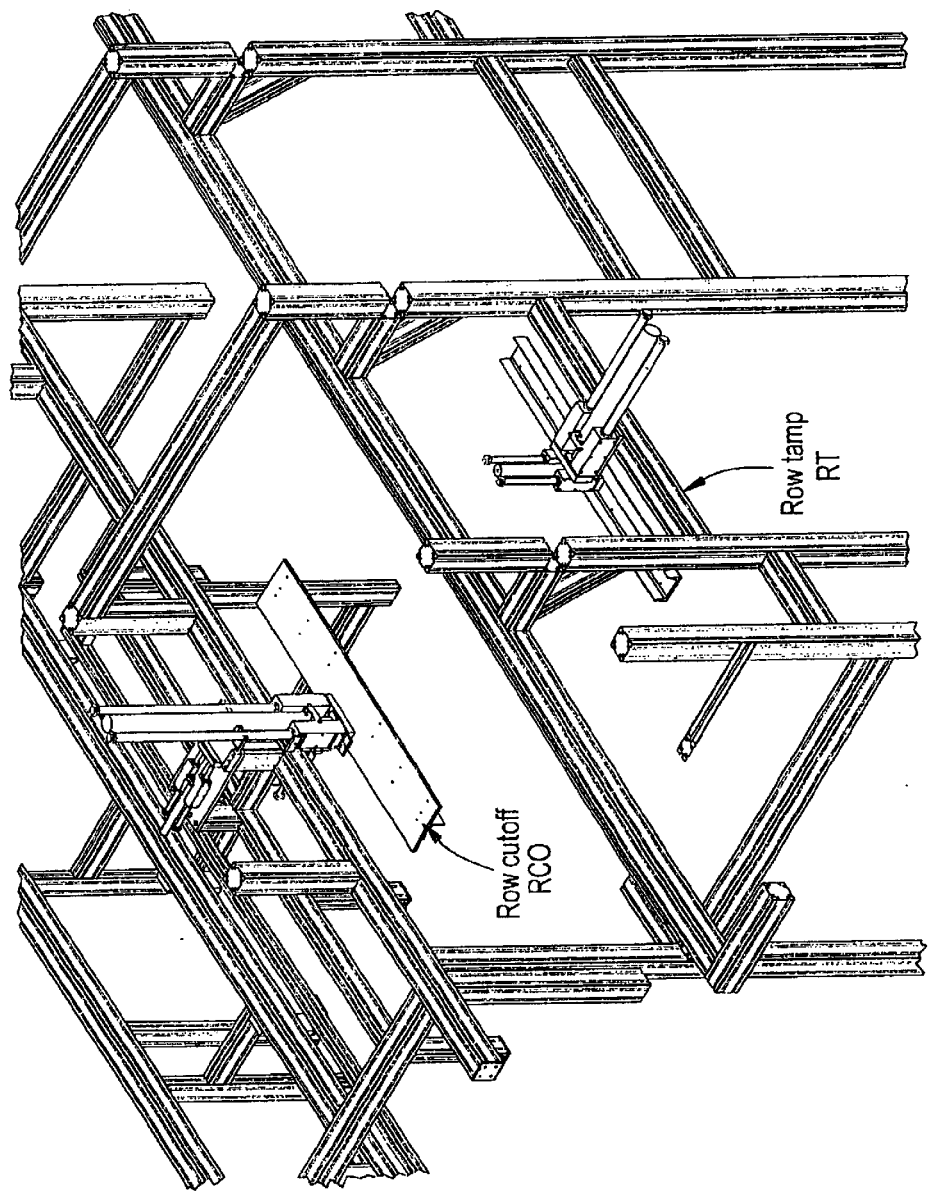
FIG. 13 is a perspective view of the row cutoff and row tamp devices.

The Row Cut Off, shown in FIG. 13, inhibits the row of sticks from retracting with the Main Table.

Figure 2:
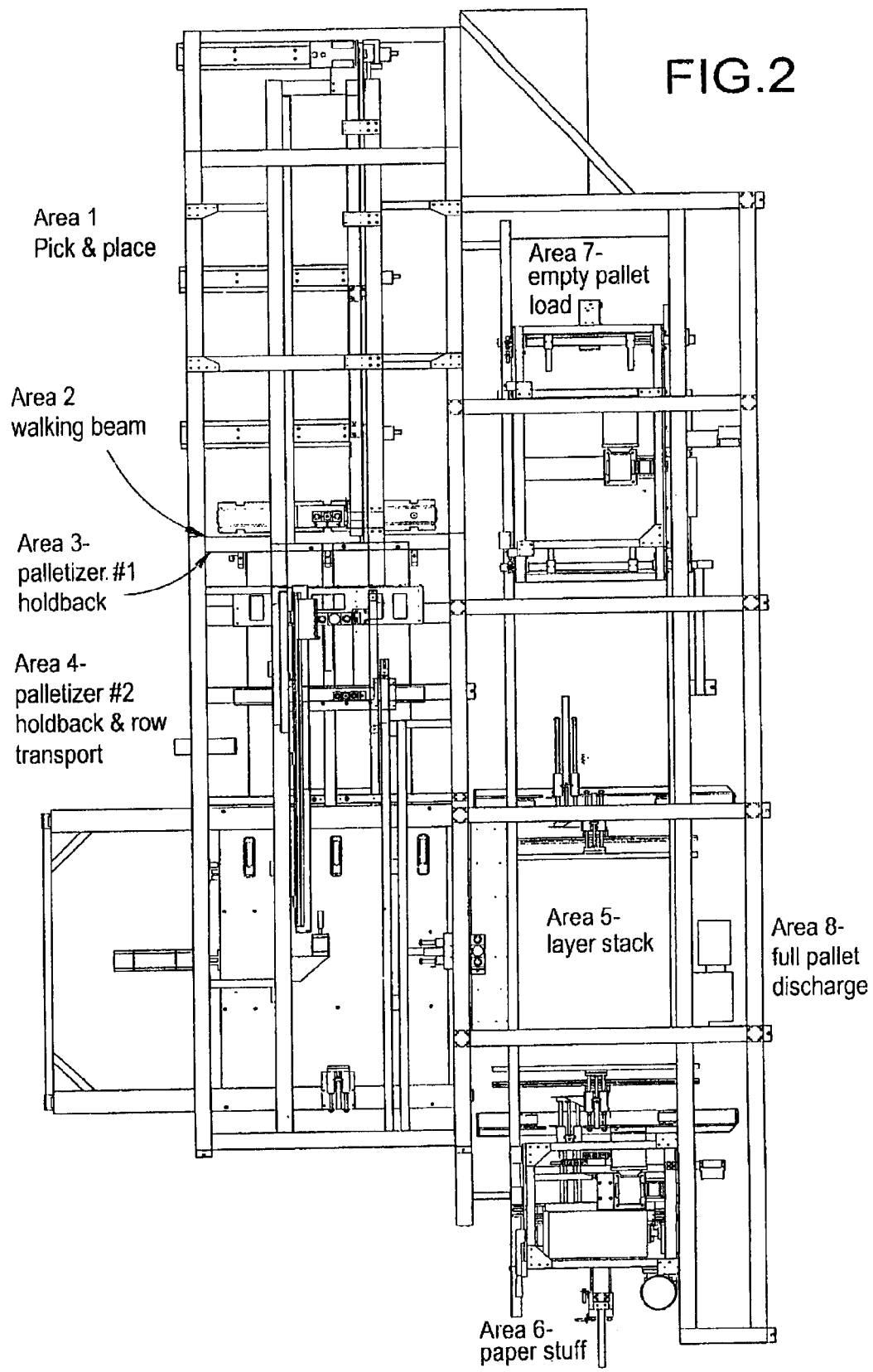
FIG. 2 is an enlarged schematic plan view of the palletizer and its components.

The Front and Rear Vertical Tampers, also shown in FIG. 2.22, compact the pallet as each new layer is placed.

The Upper Side Guides impose the row offset and retain the layer of sticks as it is placed on the pallet. The Lower Side Guides restrain the palliated layer, and support and compact the new layer being placed.

1. The Snake Wrap Carriage, seen in FIG. 20, covers each completed layer with paper after the layer is transferred to the Pallet Lift.
2. The Paper Stuffer (Area 6, FIG. 2) tucks the first layer of paper underneath the cardboard on the skid.
3. The Snake Wrap Paper Cutter cuts the wrap at the completion of the pallet.

Figure 17:
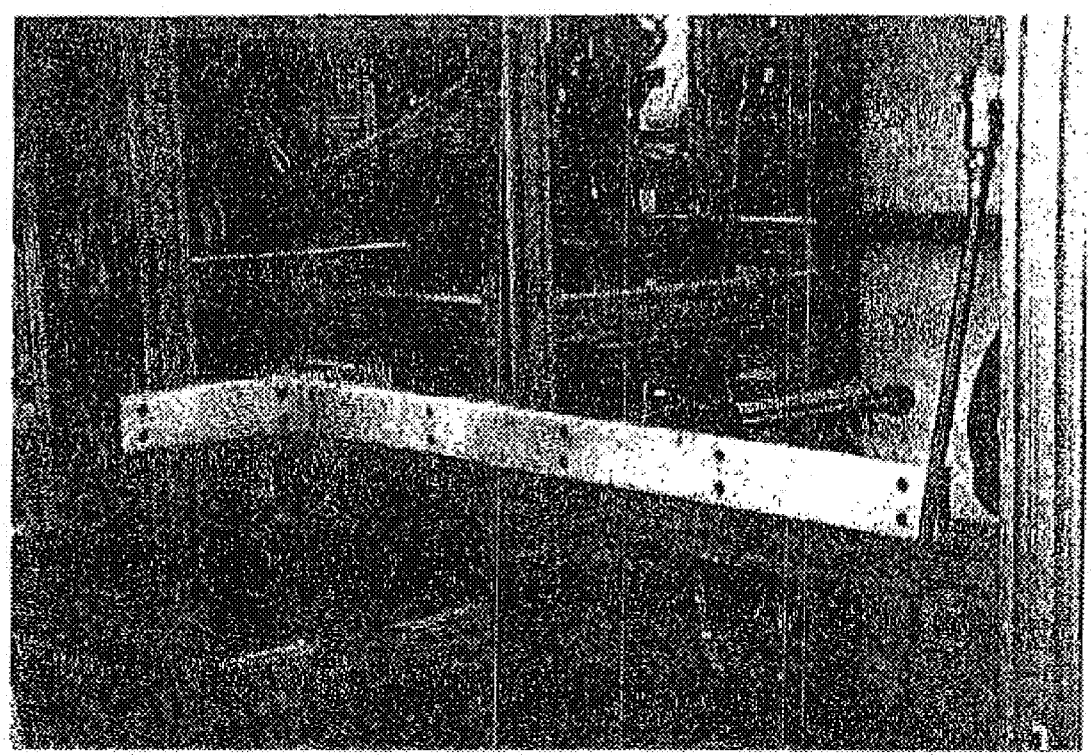
FIG. 17 is a pictorial view of the full pallet lift and pallet discharge roller table.
Figure 18:
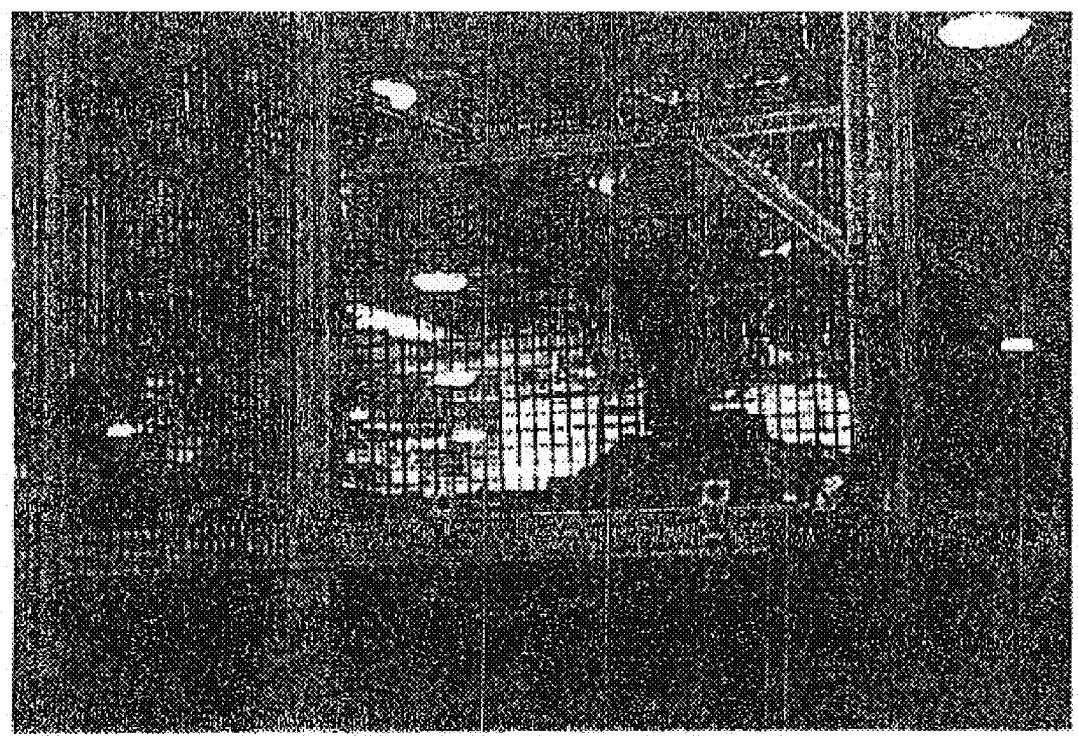
FIG. 18 is a pictorial view of the partial pallet restart alignment arm.

The Pallet Discharge Roller Table, shown in FIG. 17 is a motorized roller table that moves the completed pallet away from the pallet building area for removal by the operator. This section describes the procedures required to prepare the system for operation. It is divided into two sections; Palletizer and Bagger.

Figure 19:
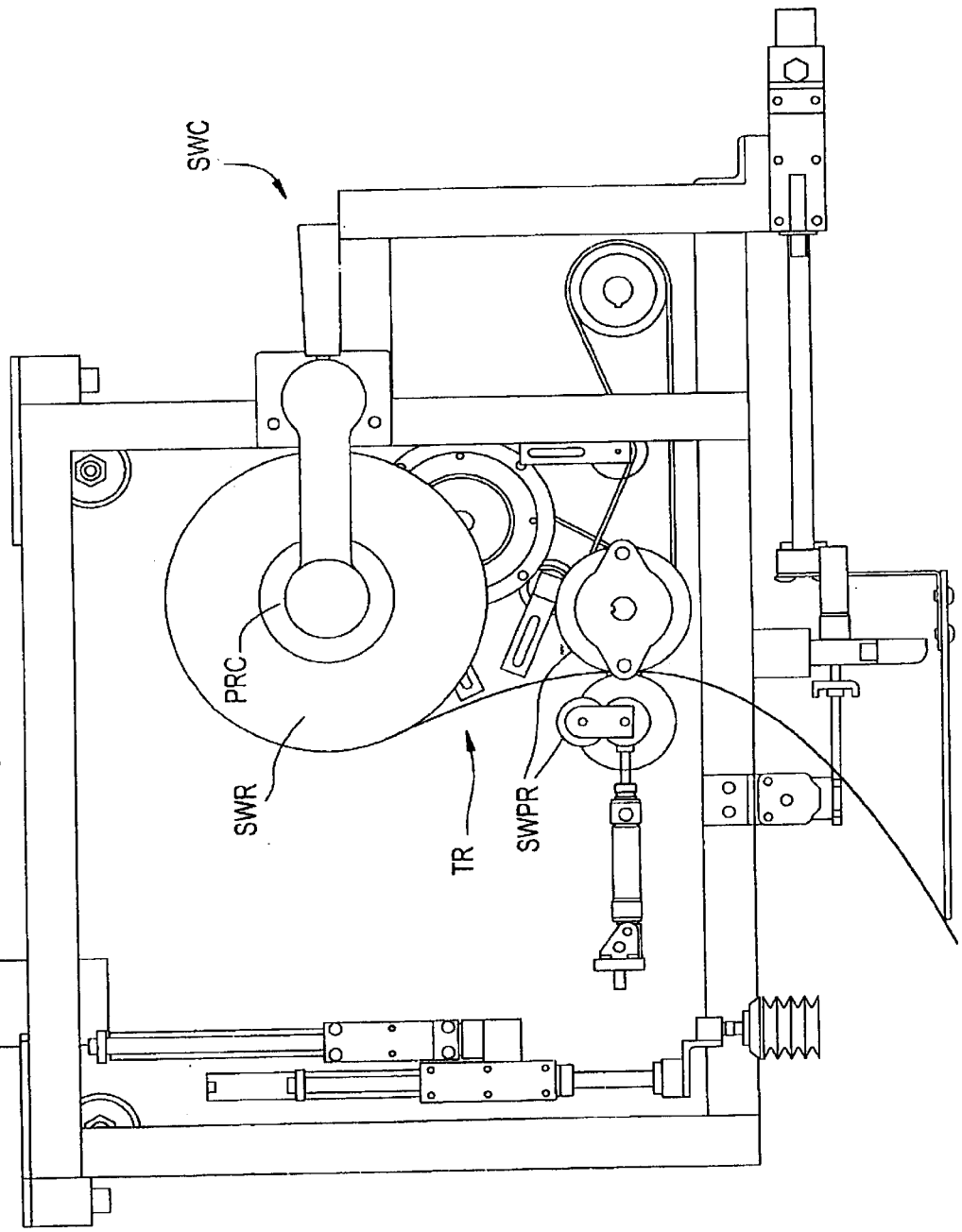
FIG. 19 is a side view of the thread up schematic for the snake wrap.
Figure 20:
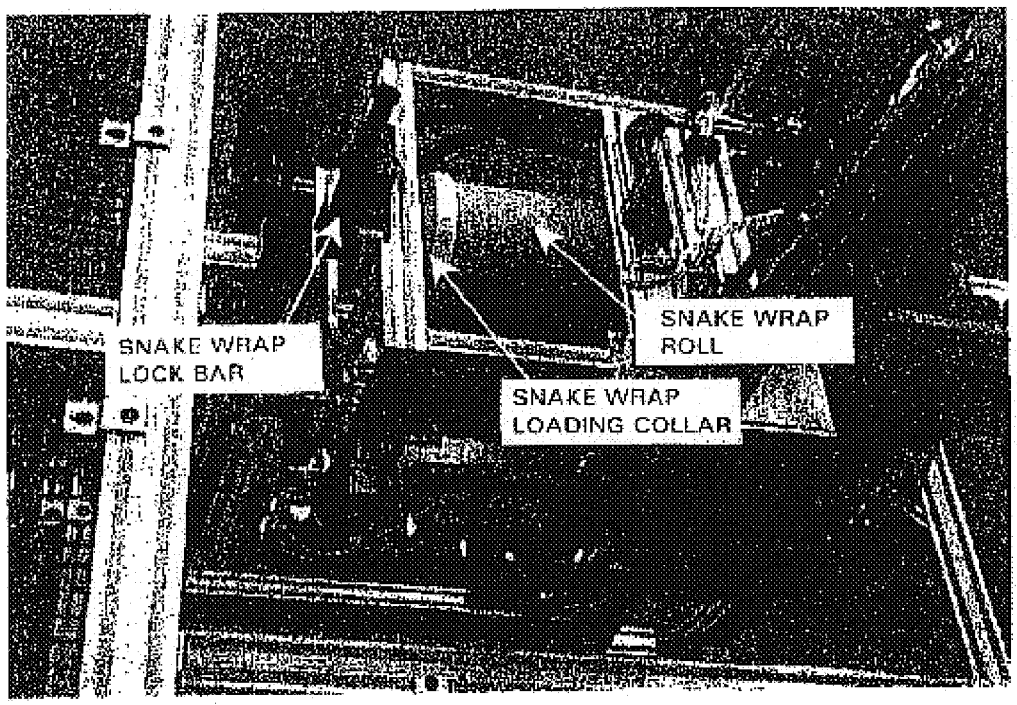
FIG. 20 is a perspective view of the snake wrap carriage, viewed from ground level.
Figures 1, 21A:
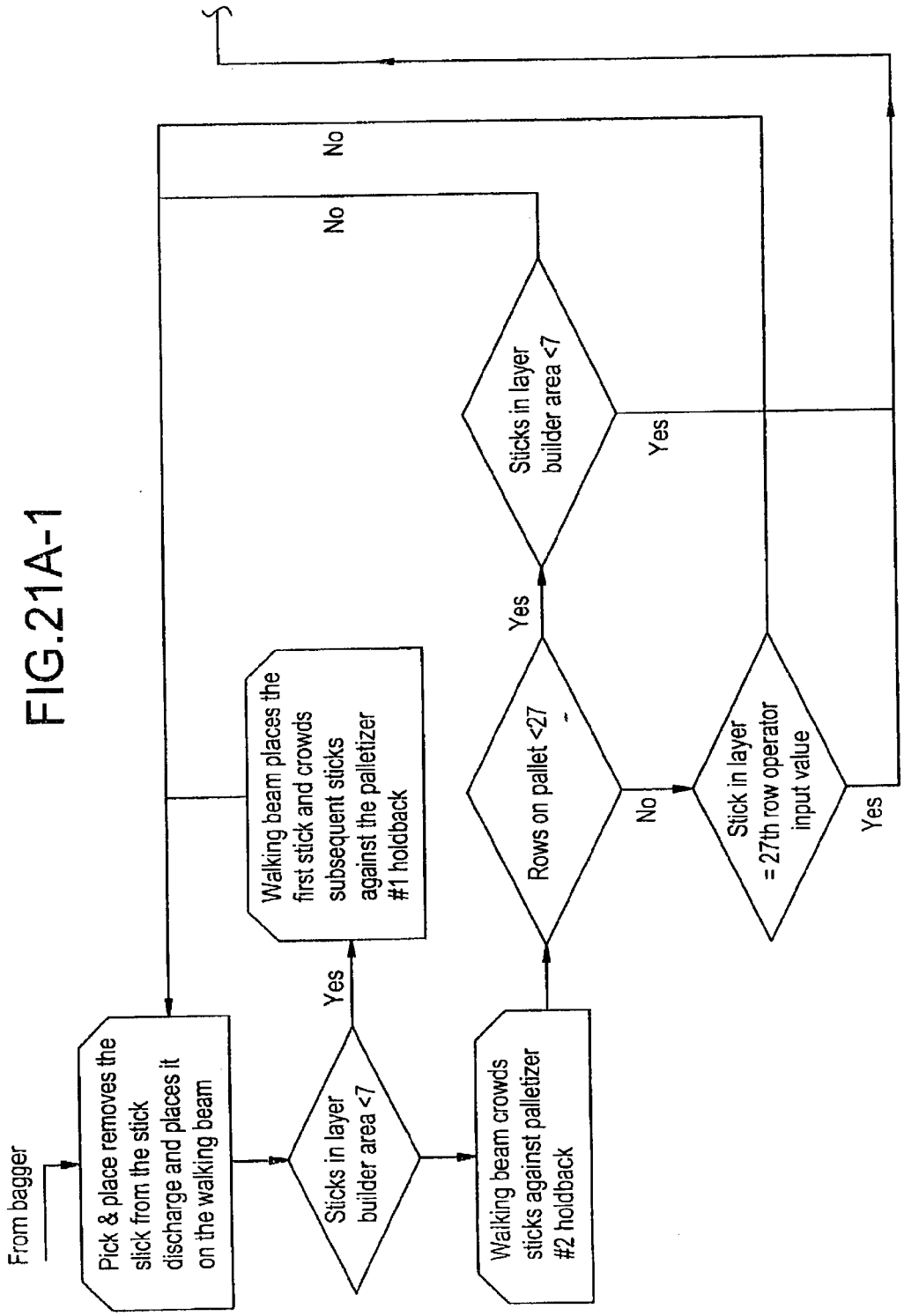
Figures 2, 21A:
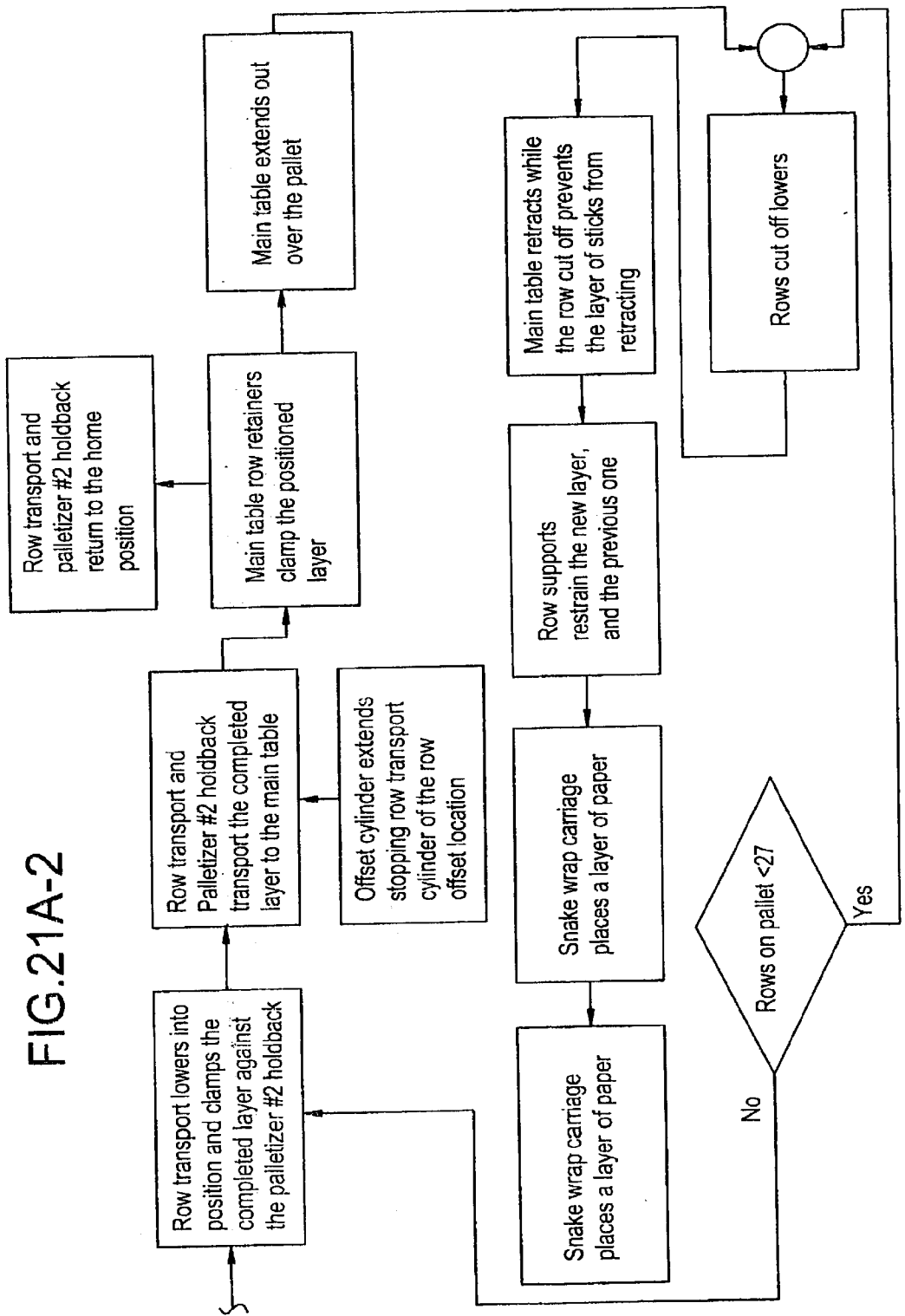
Figures 1, 21B:
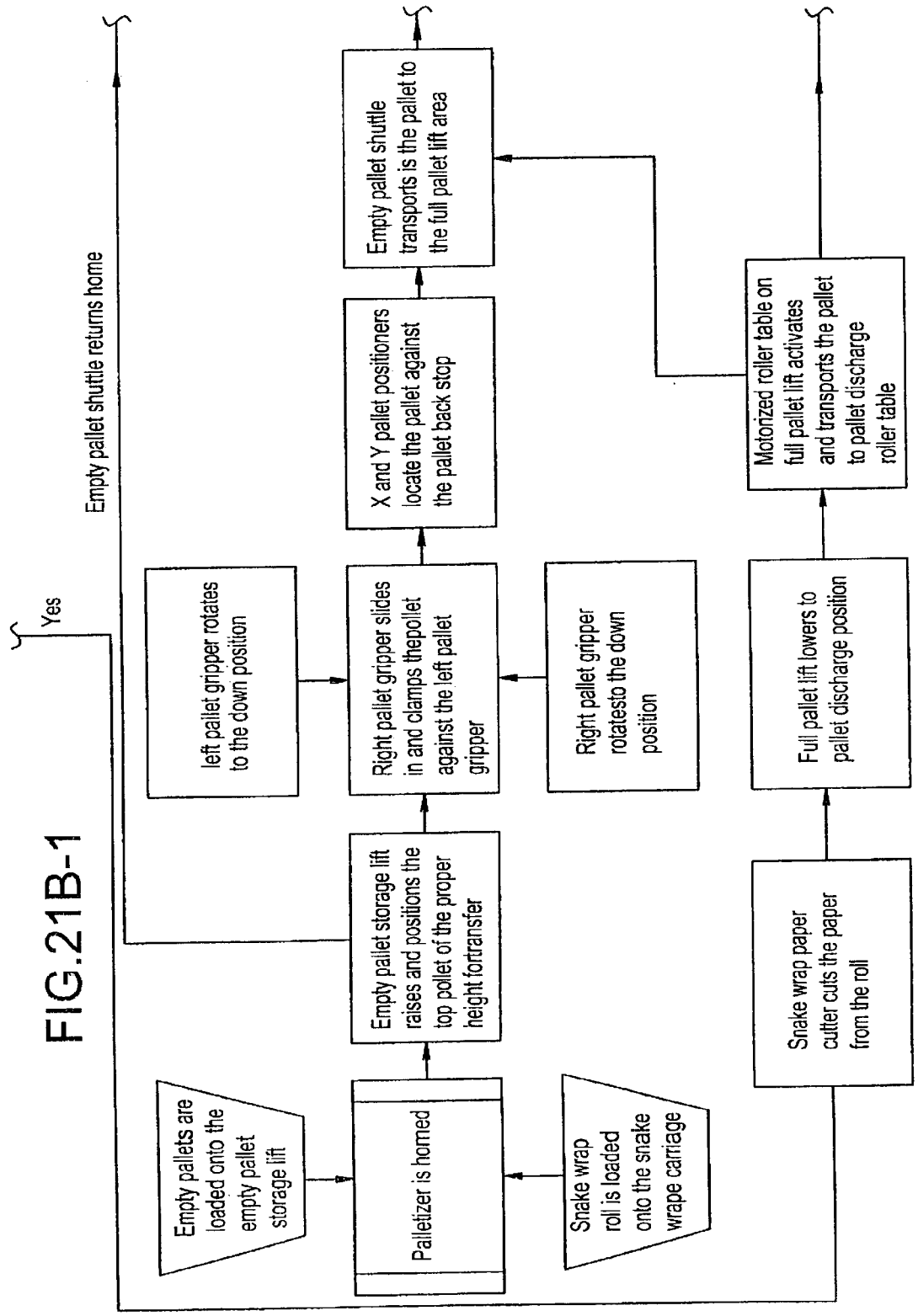
Figures 2, 21B:
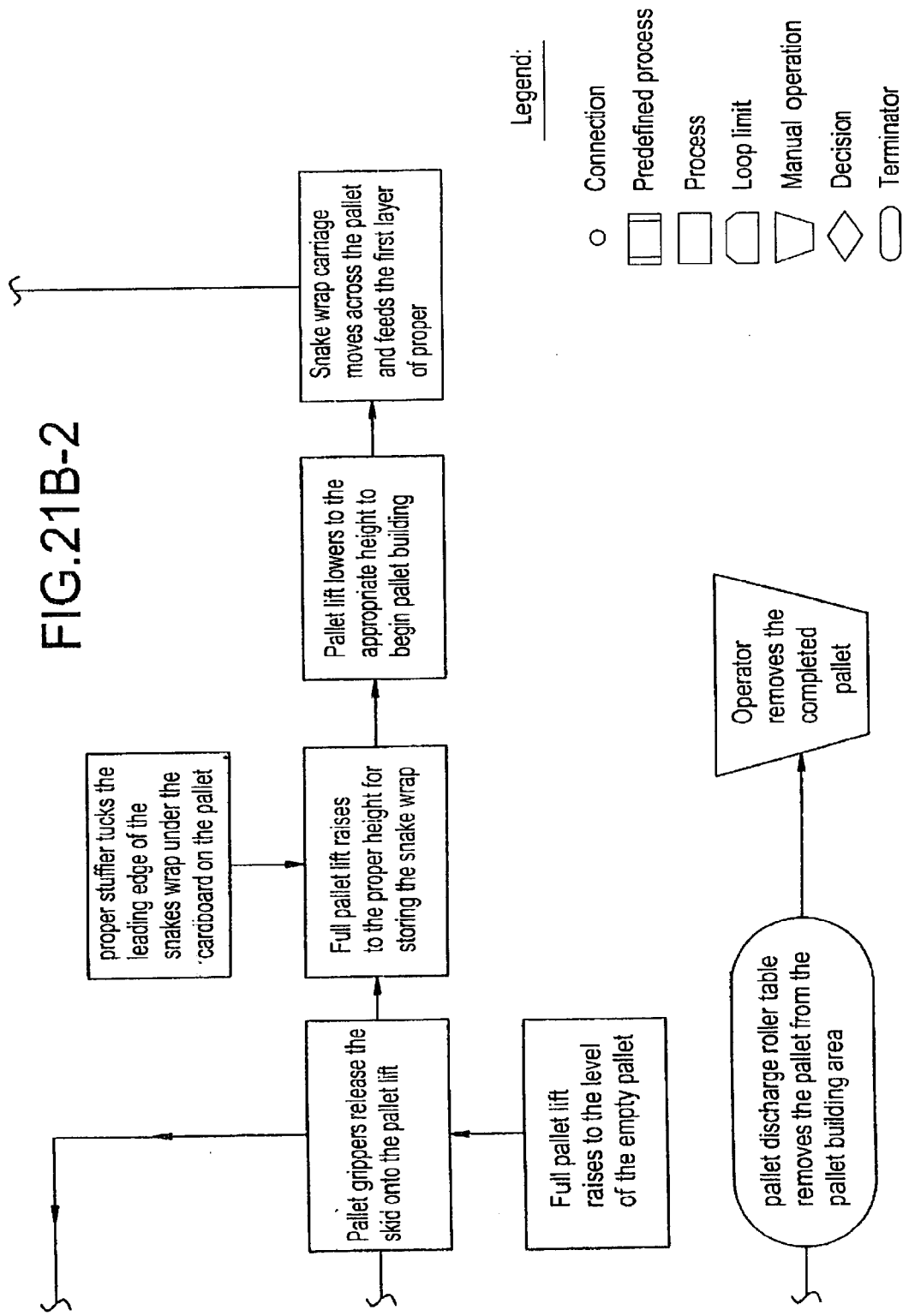

FIG. 19 is a schematic of the Snake Wrap Carriage that shows the proper thread up of the Snake Wrap Roll from the Snake Wrap Catwalk vantage point. FIG. 20 is a pictorial view from the same vantage point.

To load the Snake Wrap roll from the catwalk during system set-up, referring to FIGS. 19 and 20:

1. Open the Snake Wrap Catwalk door guard.
2. Remove the Split Collar from the Paper Roll Cylinder.
3. Align the Paper Roll such that the paper feeds counterclockwise from the top of the roll.
4. Slide the properly aligned Paper Roll onto the Paper Roll Cylinder.
5. Replace the Collar.
6. Thread the paper into the pinch rolls ensuring that the paper feeds underneath the tensioning rod prior to the pinch rolls.
7. Feed the paper between the stainless steel paper guide and the roller guide.
8. Feed the paper between the spring loaded Paper Clamp and the Roller Guide.
9. Thread the paper through the Slot below the Roller Guide.

[Close all door guards.]

The manually feed the paper by depressing and holding the Snake Wrap Jog push button, being sure to feed a sufficient amount of paper to ensure the Snake Wrap is dispensing properly. The snake wrap paper is cut with a double-edge, carpet knife blade.

Figure 10:
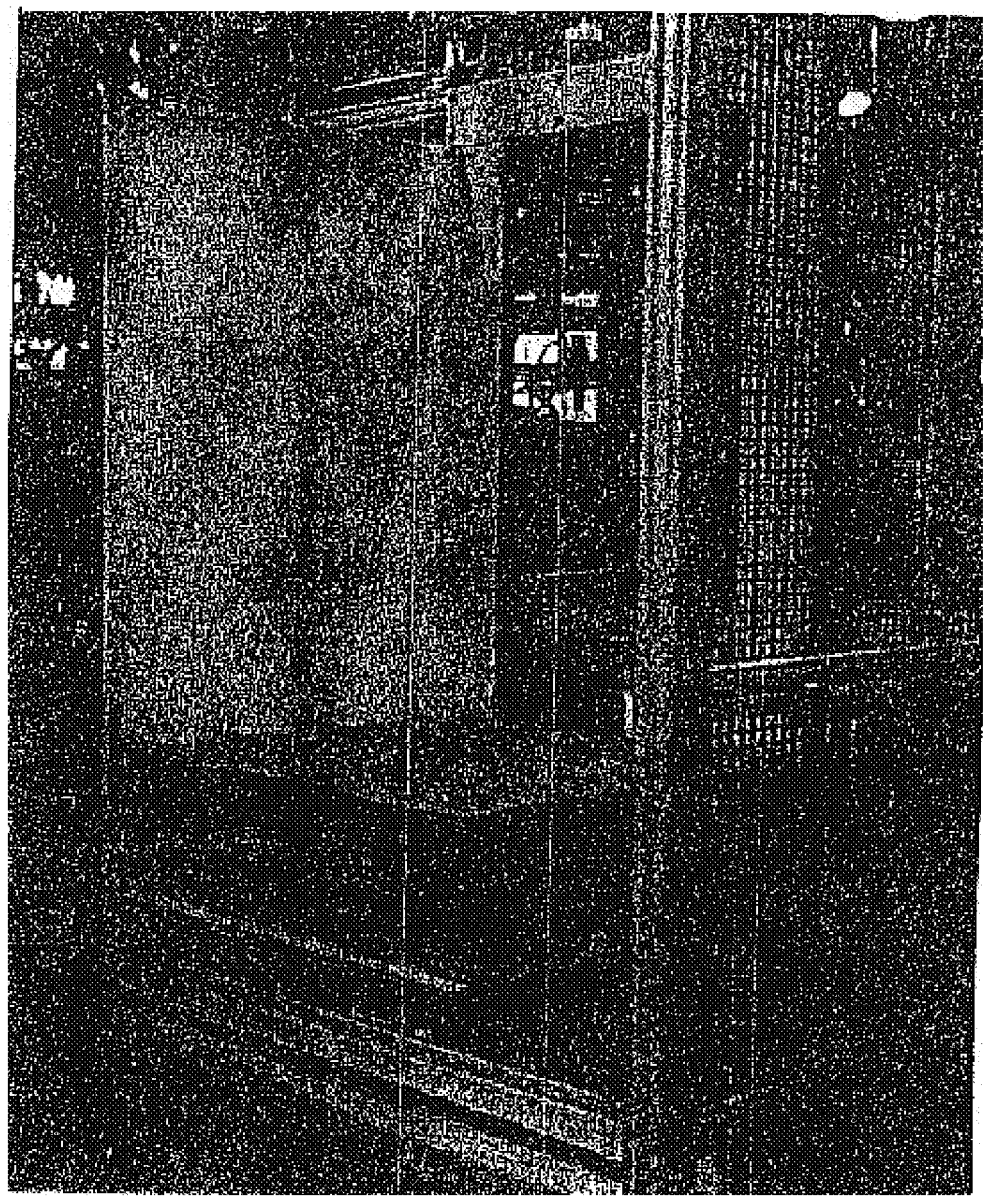
FIG. 10 is a perspective view of the empty pallet storage lift.

The skid storage lift (FIG. 10) can hold up to 10 empty skids. To load the skids onto the skid storage lift, open the door guard and place the stack of skids onto the left. Then push the stack against the stops at the rearmost and right most positions, and close the door guard.

Prior to homing the Palletizer, it is necessary to ensure that the Skid Storage Lift and Pallet Lift are in the lowest position. It is also necessary to remove all sticks from the Pick & Place, the temporary staging area, and the Main Table, and to remove any partial pallets or empty skids from the pallet lift.

Operating Sequence

Figure 5:
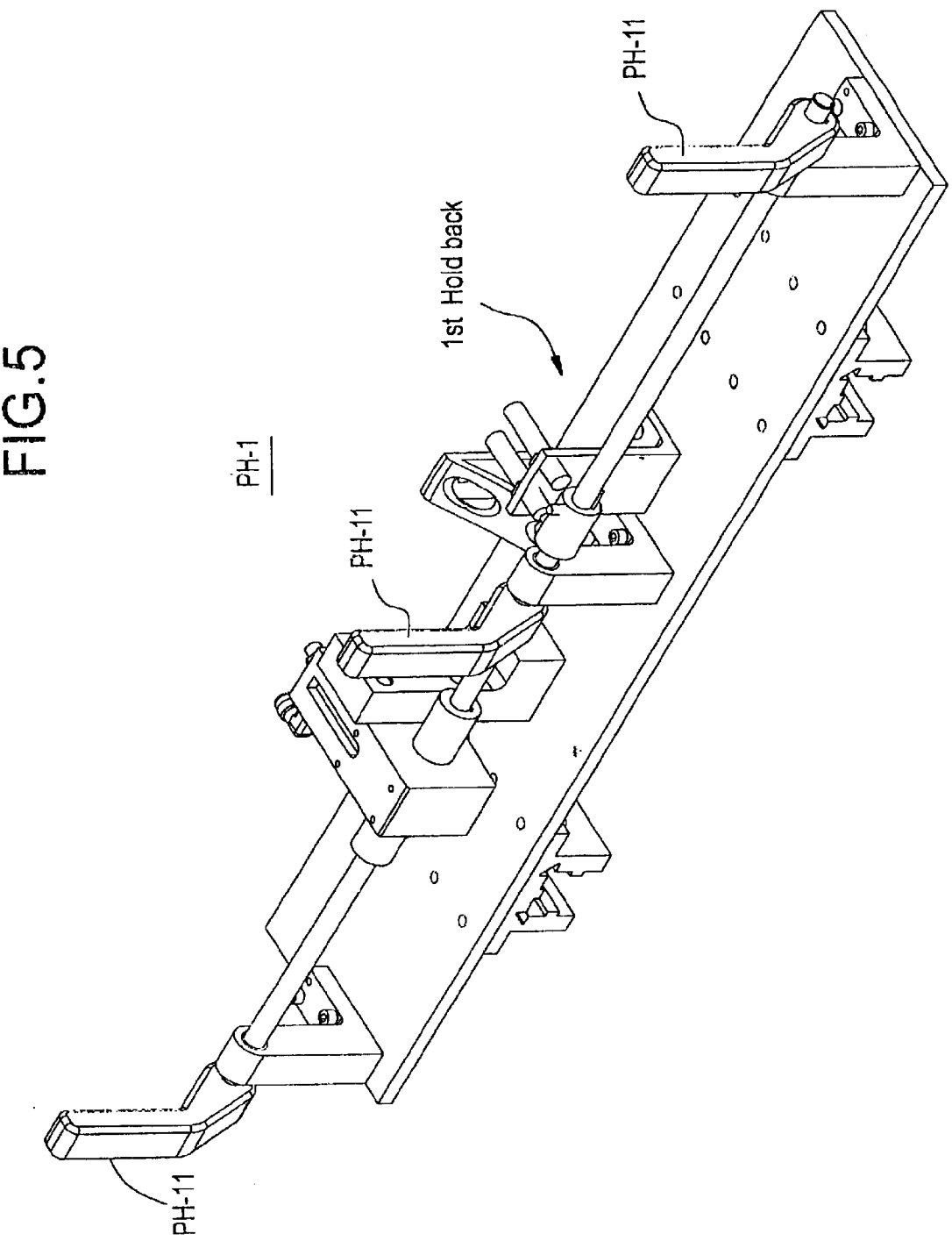
FIG. 5 is a perspective view of the first palletizer hold back device.
Figure 7:
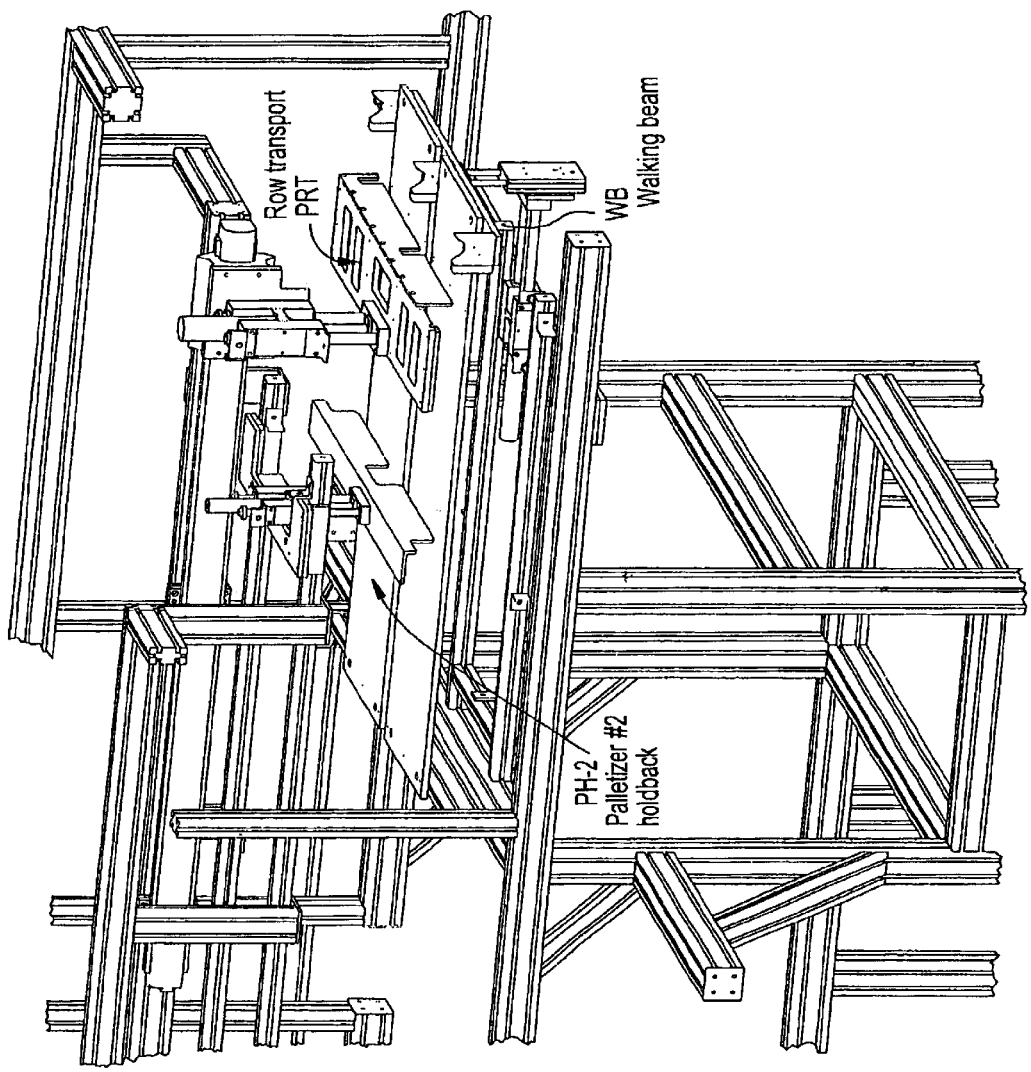
FIG. 7 is a pictorial view of the second palletizer hold back and row transport mechanism.

The pick and place mechanism PP (FIG. 3) removes a stick from the stick discharge of the Bagger apparatus, and places it on the walking beam WB (FIG. 4). Then the walking beam WB places the first stick against the temporary hold back HB-1 (FIG. 5). Those steps are repeated until a complete layer (sixteen sticks) is built. During the building process, the temporary hold back HB-1 and previously placed sticks are pushed progressively farther from walking beam WB as each of the sticks 1–7 are placed. After the 7th stick is placed, the temporary hold back HB-1 rotates below the level of the sticks, returns to its home position, and the primary hold back HB-2 begins retaining the layer. The primary hold back HB-1 and previously placed sticks continue to be pushed away from the walking beam WB as sticks 8–16 are placed (see FIG. 7).

Figure 8:
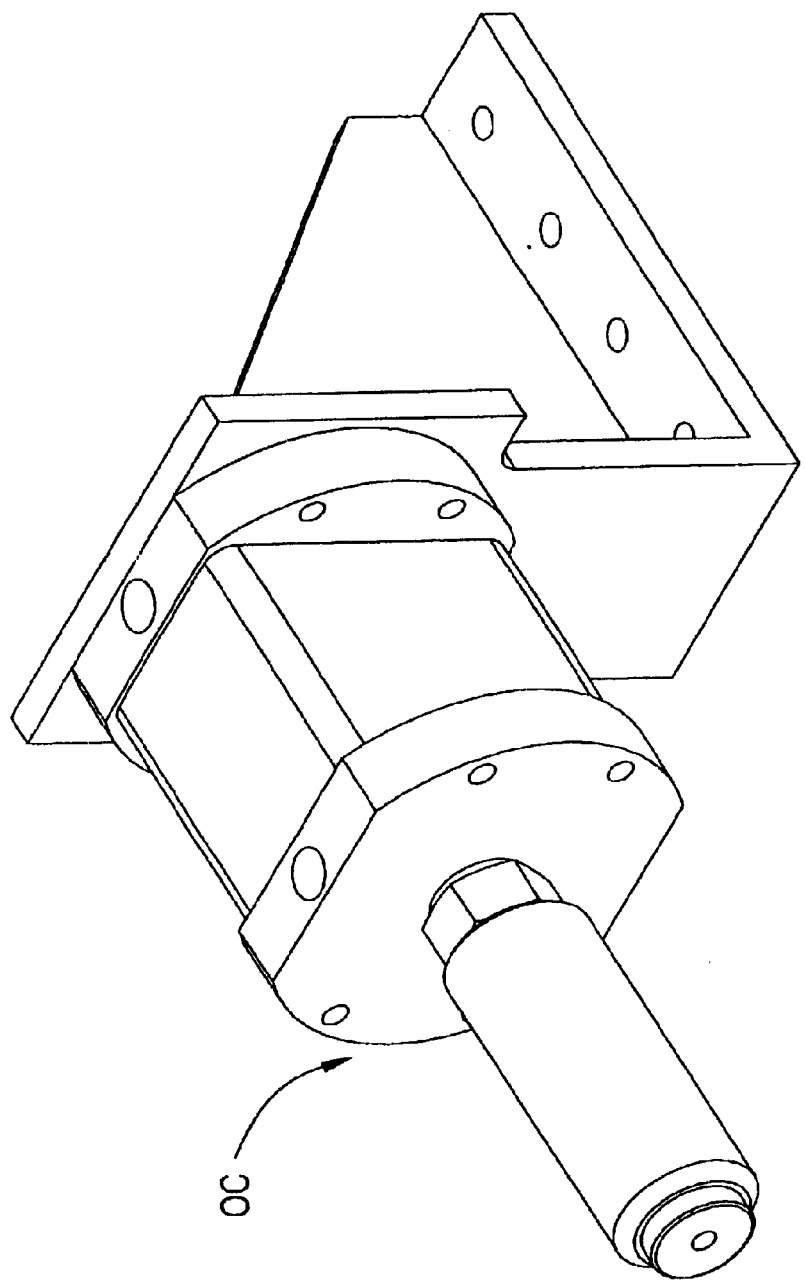
FIG. 8 is a perspective view of the row offset control cylinder.
Figure 9:
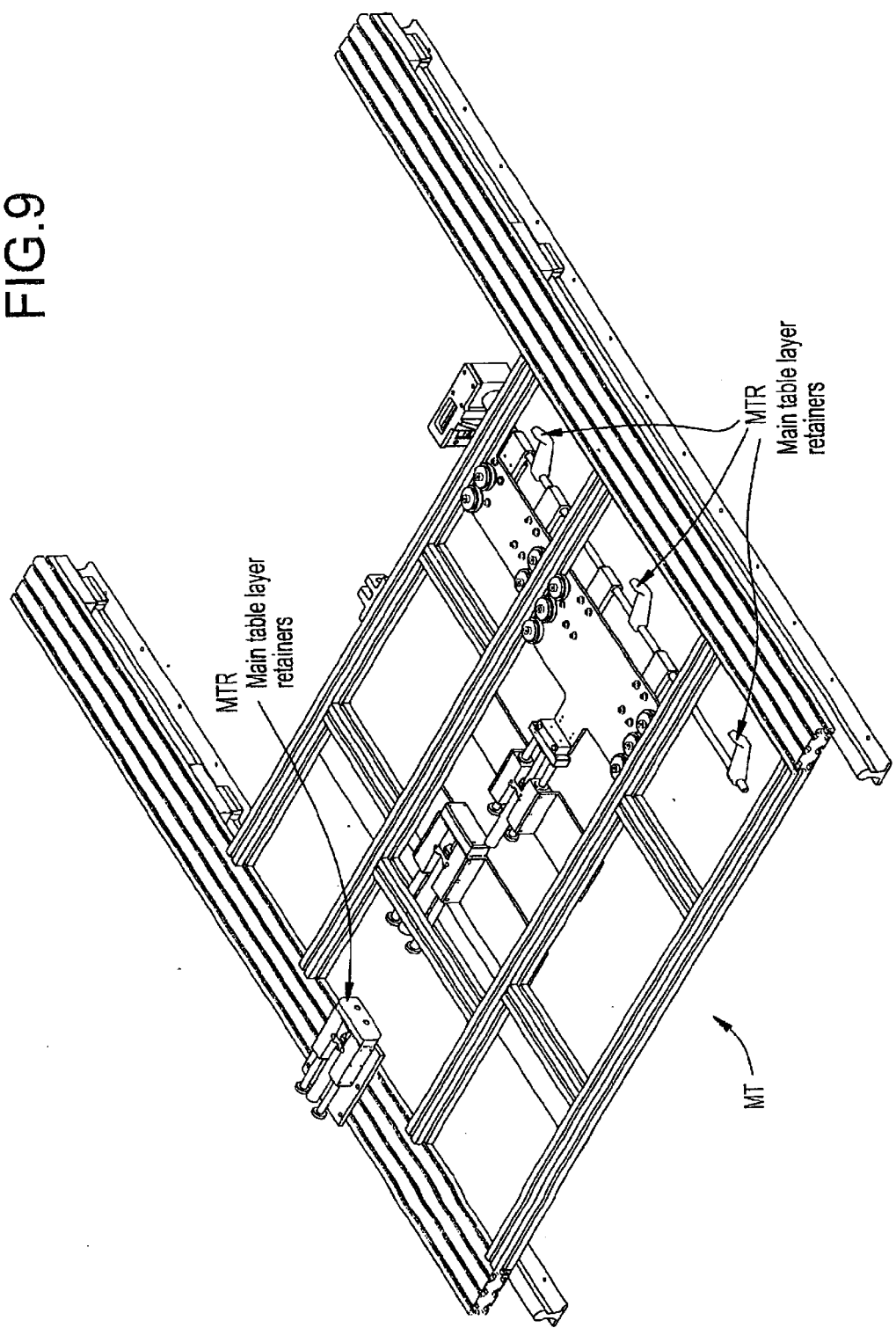
FIG. 9 is a perspective view of the main table in the palletizer.

The row transport RT lowers into position and clamps the completed layer against the primary hold back HB-2. The row transport RT and hold back HB-2 transport the completed layer from the layer building area to the main table MT. The offset cylinder OC (FIG. 8) extends and stops the row transport RT at the appropriate location for the row offset. The main table retainers MTR (FIG. 9) clamp the positioned layer. Then, the row transport RT and hold back HB-2 return to their home position.

Figure 14:
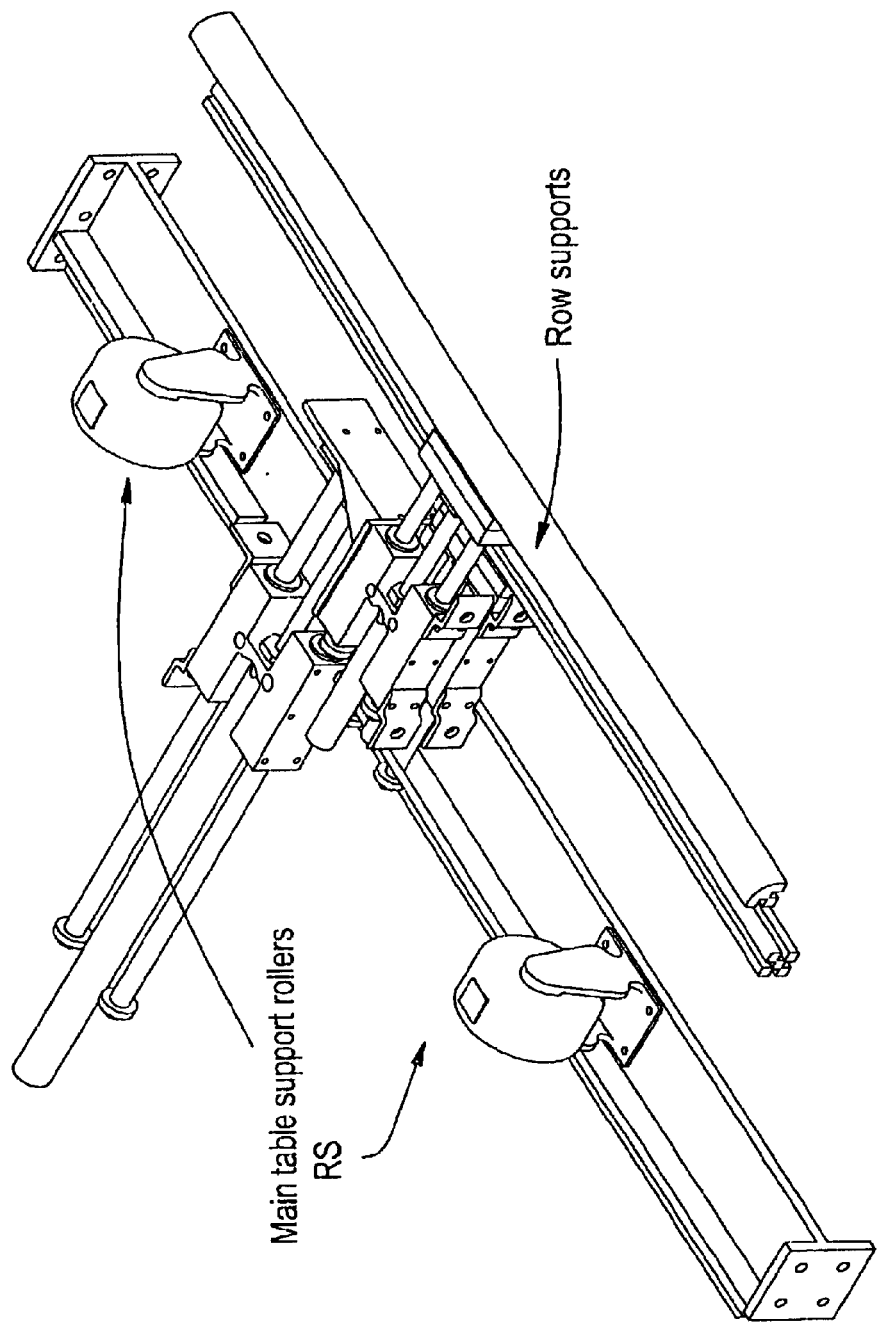
FIG. 14 is a perspective view of the row supports.
Figure 15:
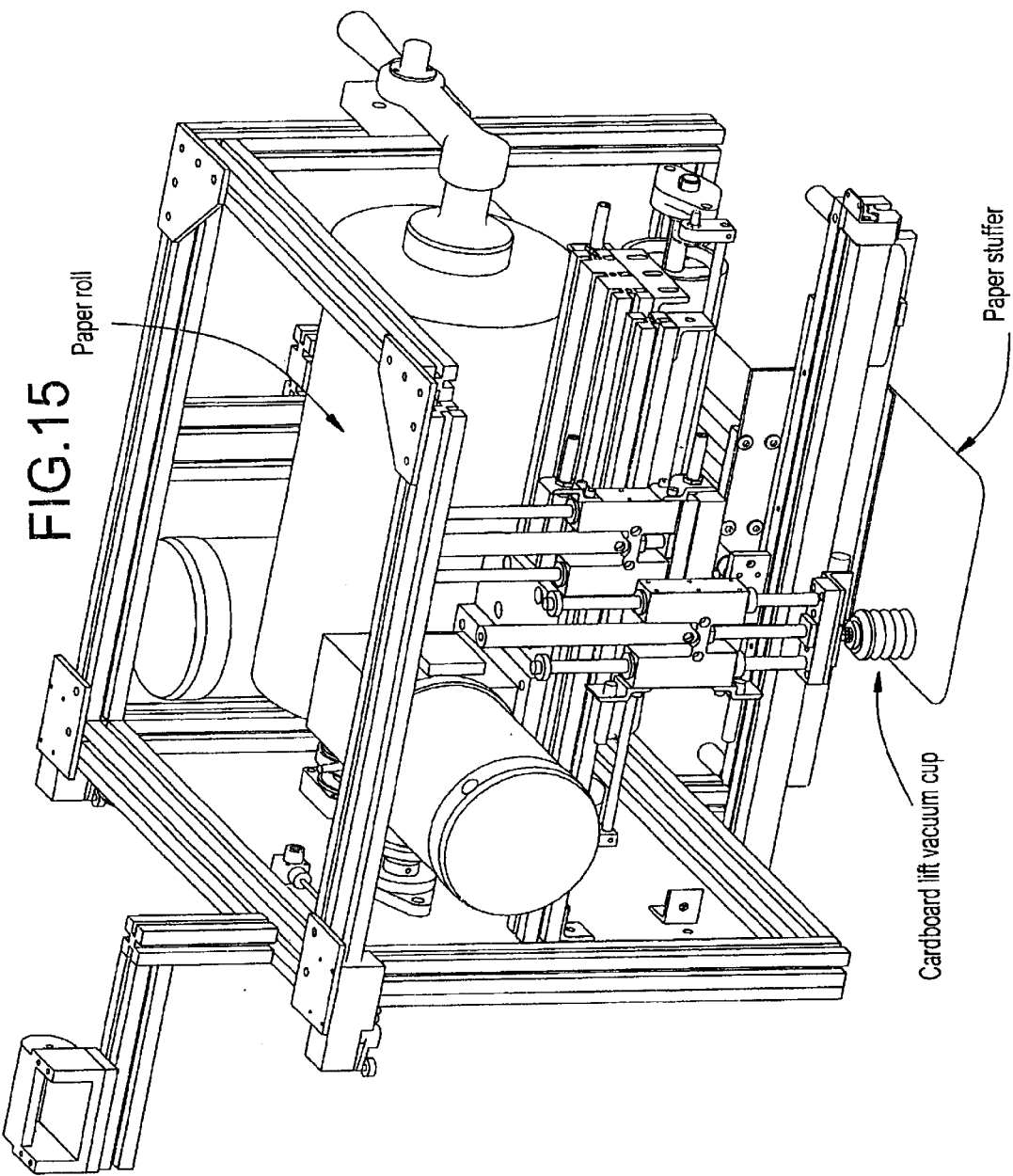
FIG. 15 is a perspective view of the snake wrap carriage, including the paper stuffer and cardboard lift vacuum cup.
Figure 16:
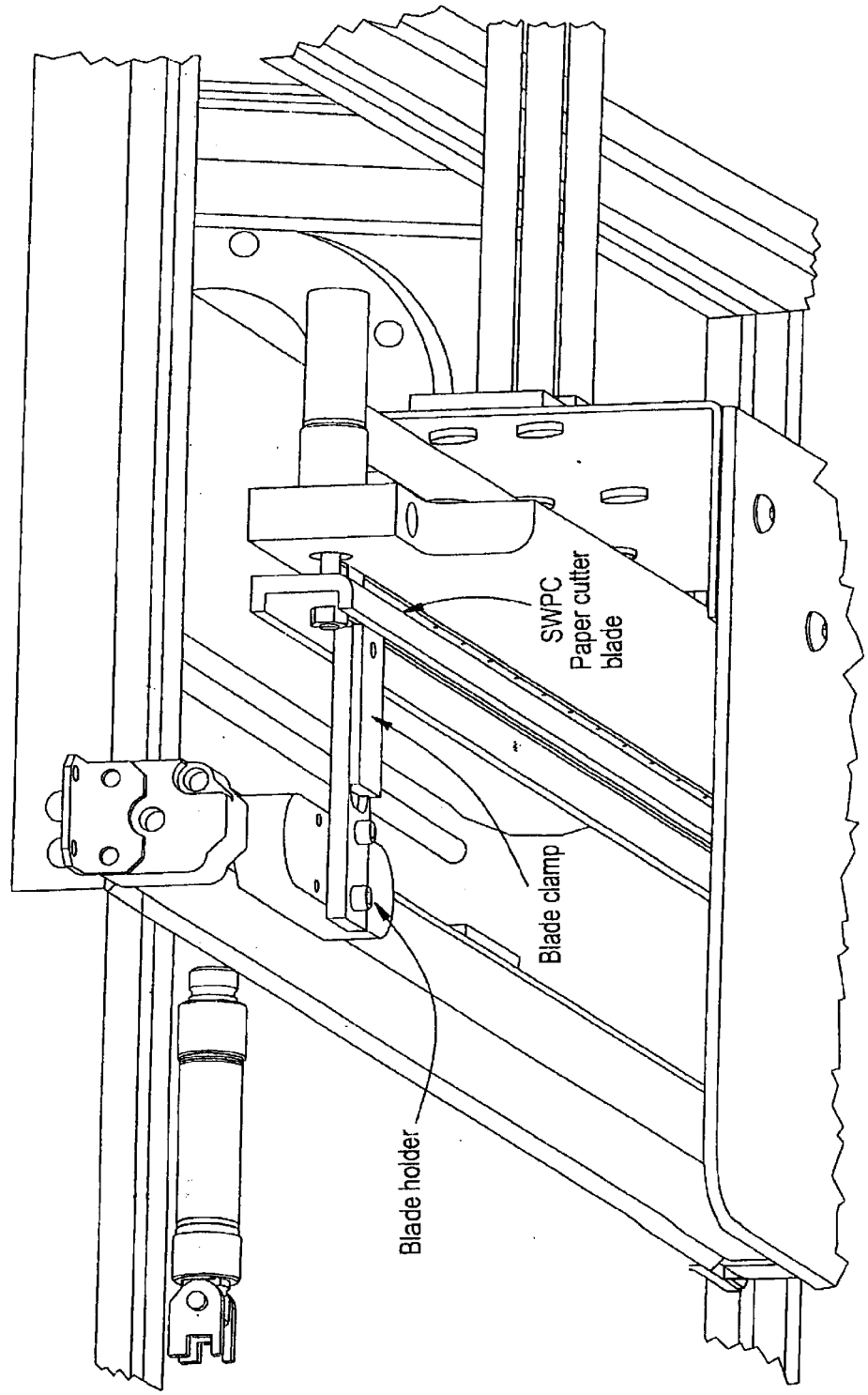
FIG. 16 is a perspective view showing the snake wrap paper cutter.

Next, the main table MT extends out over the pallet (FIG. 2) and the row cut off RCO lowers. The main table MT then retracts while the row cut off RCO hold the layer of sticks in place. Effectively they are wiped off the main table onto the top of the load on the pallet. The row supports RS (FIG. 14) restrain the layer after it is positioned, and the row tamp RT (FIG. 13) compacts the layers on the pallet as each layer is placed.

The snake wrap carriage SWC drapes a layer of wrap on top of the completed layer, and waits on the opposite side of the pallet for the next layer to be placed. The row tamp again compacts the layers of the pallet. The foregoing steps are repeated until the pallet is complete, normally when 27 rows are in place.

After completing the last layer of paper wrap, the snake wrap paper cutter WPC cuts the wrap from the roll. The full pallet lift FPL then lowers to its discharge position. The motorized roller table on the full pallet lift turns on and transports the full pallet to the pallet discharge roller table DRT. It in turn transports the pallet away from the pallet building area to allow the operator to remove the completed pallet. The empty pallet shuttle EPS transports an empty pallet from the empty pallet storage lift to the pallet Lift PL to begin building the next pallet.

While the methods and apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A palletizing apparatus for loading a pallet with successive rows of cylindrically shaped container end sticks, comprising pick and place means for grasping a predetermined quantity of the sticks to form a layer of a pallet, one at a time in succession, and maintaining each stick in a predetermined orientation, a pallet loading station including a lift receiving a skid on which a pallet is to be built, said lift including a vertically adjustable lift platform for supporting a skid to form the base of a pallet, control means for moving said platform to and from a lower skid receiving location and through a range of upper loading locations, said control means including means for adjusting the upper surface location of a pallet being built upon the skid to a predetermined elevation at which assembled rows of sticks are added to the top of the pallet, a main table and means for moving said main table between a receiving and assembly station and a loading station over the top of the assembling pallet, said pick and place means having control means for placing the oriented sticks sequentially onto said main table in a side by side row of the predetermined number of oriented sticks, a wrapping supply roll, a moving support for said roll including control means for shifting said roll back and forth to lay the wrapping across the top of each row of sticks added to the assembling pallet, means for attaching a free end of the wrapping supply roll to an empty skid on said lift platform, means for transferring each row of sticks placed on said main table onto the top of a layer of wrapping, means for passing the wrapping over the last placed row, and means for discharging completed pallets from said pallet loading station.

2. palletizing apparatus as defined in claim 1, including a programmable controller for commanding the sequencing and operation of said pick and place means, said control means for said lift platform and said control means for adjusting the upper surface location of a pallet, said means for moving said main table, said control means for shifting said moving roll support, and said means for transferring a row of placed sticks from said main table onto the top of a building pallet.

3. A palletizing apparatus as defined in claim 1, wherein said pick and place means includes a traveling gripper which container close about an oriented stick supplied to said apparatus, a staging mechanism including a walking beam member having a moving cradle for receiving a stick from said traveling gripper, and also including a hold back mechanism spaced from said cradle to control the positioning of oriented sticks delivered to said hold back mechanism from said moving cradle, and means for transferring the an assembly of oriented sticks from said staging mechanism to said main table.

4. A palletizing apparatus as defined in claim 1, further comprising
   a skid storage station adjacent said pallet loading station for storing a quantity of skids,
   means for aligning and transferring a skid from said storage station to said lift platform.

5. A palletizing apparatus as defined in claim 4, including
   means controlled by said programmable controller for sequencing said aligning and transferring means after a completed pallet is discharged from said pallet loading station.

6. A palletizing apparatus as defined in claim 1, further including
   tamping means associated with said means for transferring a row of sticks from said main table and operable to tamp the row of sticks last added to the pallet.

7. A palletizing apparatus as defined in claim 1, further including
   pallet discharge means comprising a power driven roller tables incorporated in said lift platform, and
   means for actuating said power driven roller table to discharge a completed pallet from the palletizer apparatus.

8. A palletizing apparatus as defined in claim 7, further including control means operated by said programmable controller to actuate said power driven roller table once a pallet has been completed.

9. A method of assembling a pallet with successive rows of container end sticks, comprising
   a) receiving a succession of individual cylindrically shaped sticks each in a predetermined orientation,
   b) placing the sticks sequentially into a rows of each predetermined number of sticks,
   c) locating a skid at a pallet loading station to form the base of a pallet of container end sticks to be built at the loading station,
   d) attaching the end of a roll of wrapping material to the skid,
   e) moving the wrapping material across the skid
   f) loading successive rows of sticks onto the top of a layer of wrapping, the first row being supported on the empty pallet,
   g) passing the wrapping over the last placed row following a back and forth motion over the successively loaded rows of sticks until a desired number of rows is automatically built up into a complete pallet,
   h) severing the uppermost layer of wrapping from the supply roll, and
   I) removing the completed pallet from the loading station.

10. A matter of assembling a pallet as defined in claim 9, including the further steps of
   a-1) during step (b) initially grasping each stick with a traveling gripper which can close about an oriented stick supplied to said apparatus to maintain the orientation of the sticks,
   b-1) depositing each stick onto a walking beam member having a moving cradle for receiving a stick from said traveling gripper,
   b-2) placing the sticks in succession against a hold back mechanism and alongside each other to control the positioning of oriented sticks delivered from the moving cradle, and
   b-3) means for transferring the assembled oriented sticks onto a main table at its receiving position.

11. A method of assembling a pallet as defined in claim 10, further comprising
   j-1) storing skids at a storage station adjacent the pallet loading, and
   j-2) aligning and transferring a skid from the storage station to the pallet loading station.

12. A method of assembling a pallet as defined in claim 11, further including
   f-1) tamping the row of sticks last added to the pallet.

13. A method of assembling a pallet as defined in claim 12, wherein step (I) includes
   I-1 actuating a power driven roller tables incorporated into the bottom of the loading station to discharge a completed pallet from the palletizer apparatus.

14. A method of assembling a pallet as defined in claim 13, wherein steps (a) through (I-1) are accomplished automatically by an electronic controller system programmed to supply a skid, assemble a predetermined number of pre-oriented sticks into rows and place such rows on the skid with interleaved wrapping material, then discharging the resultant loaded pallet.

\* \* \* \* \*